United States Patent [19]

Cole

[11] Patent Number: 5,403,992
[45] Date of Patent: Apr. 4, 1995

[54] ELECTRICALLY HEATED PANELS

[75] Inventor: Graham M. Cole, Lymington, England

[73] Assignee: Imetec S.p.A., Bergamo, Italy

[21] Appl. No.: 43,527

[22] Filed: Apr. 6, 1993

[30] Foreign Application Priority Data

Apr. 11, 1992 [GB] United Kingdom ............... 9208182

[51] Int. Cl.$^6$ ................. H05B 3/34; H05B 3/56; H02H 5/04; H02H 7/00
[52] U.S. Cl. .................. 219/528; 219/212; 219/505
[58] Field of Search ............ 219/528, 212, 505, 517, 219/501, 503; 361/104; 323/320, 324

[56] References Cited

U.S. PATENT DOCUMENTS

| 3,493,727 | 2/1970 | Hosokawa et al. | 219/505 |
|---|---|---|---|
| 3,564,203 | 2/1971 | Naoi et al. | 219/501 |
| 3,586,831 | 6/1971 | Naoi et al. | 219/505 |
| 3,920,956 | 11/1975 | Endo et al. | 219/503 |
| 4,219,857 | 8/1980 | Haraldsson et al. | 361/104 |
| 4,251,717 | 2/1981 | Cole | 219/505 |
| 4,251,718 | 2/1981 | Cole | 219/505 |
| 4,278,874 | 7/1981 | Cole | 219/505 |
| 4,491,723 | 1/1985 | Cole | 219/505 |
| 4,547,658 | 10/1985 | Crowley | 219/539 |
| 4,575,620 | 3/1986 | Ishii et al. | 219/212 |
| 4,698,488 | 10/1987 | Kishimoto | 219/549 |
| 4,755,656 | 7/1988 | Charlesworth et al. | 219/501 |

FOREIGN PATENT DOCUMENTS

| 57-13526 | 1/1982 | Japan | 219/212 |
|---|---|---|---|
| 57-201917 | 12/1982 | Japan | 219/505 |
| 932217 | 7/1963 | United Kingdom | 323/320 |
| 1155118 | 6/1969 | United Kingdom . | |
| 1242413 | 8/1971 | United Kingdom . | |
| 2028608 | 3/1980 | United Kingdom . | |
| 2047487 | 11/1980 | United Kingdom | 219/505 |
| 1585921 | 3/1981 | United Kingdom . | |
| 1599709 | 10/1981 | United Kingdom . | |
| 2154816 | 9/1985 | United Kingdom | 219/212 |
| 2157514 | 10/1985 | United Kingdom | 219/212 |
| 2186134 | 8/1987 | United Kingdom . | |
| 2207014 | 1/1989 | United Kingdom . | |
| 2245440 | 1/1992 | United Kingdom . | |
| 1056426 | 11/1983 | U.S.S.R. | 323/320 |

Primary Examiner—Geoffrey S. Evans
Attorney, Agent, or Firm—Young & Thompson

[57] ABSTRACT

An electric blanket includes a heating element comprising inner and outer coaxial coil conductors separated by an electrically insulating layer and connected by a diode. A control assembly is connected to the heating element by a simple two-core flexible electrical cable and incorporates a thyristor and a thyristor control circuit to vary the supply of current to the heating element. Protective diodes are connected in parallel with the main heating conductor and also in parallel with the thyristor. Should the heating element overheat the insulating layer breaks down causing a short circuit between the conductors and the surge of current allowed by the protective diodes causes a fuse to blow. The conductor is always in series with the protective diodes so that in the event of transient breakdown of one of the diodes the resistance of the conductor prevents fuse operation.

9 Claims, 1 Drawing Sheet

ELECTRICALLY HEATED PANELS

BACKGROUND OF THE INVENTION

The invention relates to electrically heated panels. The invention is particularly applicable to electric blankets, and will be specifically described in relation thereto. However, it will be appreciated that the invention may also be applied to many other forms of heated panels, such as under-carpet heaters, mattresses and pads.

Electric blankets commonly include a heating element in the form of inner and outer concentric coil conductors separated by an electrically insulating layer. One or other, or both, of the coils provide the heating effect. Should overheating occur, the insulating layer separating the two conductors is designed to melt, causing the two conductors to come into electrical contact with one another, causing a short circuit or low impedance path to occur. This causes a surge of current in the electric circuit containing the conductors, causing a fuse to blow and thus isolating the blanket from the mains supply.

There are many ways of detecting that a short circuit or low impedance path has developed between the two conductors, and examples of suitable circuits are described in British Patent Specifications Nos. 1155118, 1585921, 1599709, and 2028608. However, the known arrangements suffer from certain disadvantages and there are three particular problem areas which the arrangements described in the above-mentioned specifications, and many other arrangements, fail to address.

Apart from incorporating an effective overheat protection system an electric blanket must, in order to be a practical commercial proposition, also incorporate means for providing selective multiple heat settings. The above-mentioned specifications therefore all show ways in which the two resistive conductors of the heating element can be switched or electrically connected so as to provide the required alternative heat settings.

In practice, in order to achieve the required heat settings the four, or more, ends of the conductors are connected to either an in-line switch or a bedside control unit. In some cases the coaxial heating conductors themselves are extended, within a protective sheath, from the blanket to the switch in which the required electrical connections are made. In other blankets the ends of the heating conductors are connected to conventional bunch stranded copper multicore cables which lead to the switch or control unit where they are connected to electric circuitry for controlling the multiple heat settings and the overheat protection circuitry. In some blankets an intermediate multi-pin plug and socket may be provided between the blanket and the connecting cable leading to the switch or control unit.

In both of these known arrangements the sheath type interconnection or multi-core cable is bulky and heavy and relatively stiff, particularly under cold conditions, and accordingly may be difficult to manipulate and stow away, leading to complaints from users as a result of the intrusive nature of the cables. More importantly, however, although electric blankets of this kind have led to a large reduction in fires caused by overheating of the blanket, there has been an increase in the number of fires caused by arcing due to failure of the electrical flex leading to the blanket. It is now well accepted that in the many blankets on the market today, which are well protected against overheating, the weakest part of the blanket is the multicore connection between the blanket and the switch or control box. This has been as a direct result of the provision of overheat protection because in early simple electric blankets which were used to pre-heat beds, and where overheat protection was not provided, it was possible to use simple slim two-core round flex, or flat twin cables, between the blanket and control switch or unit. The life of such cables, and resistance to fatigue and failure through flexing, is many times greater than that of, in particular, the bulky four core cables now conventionally required in blankets with overheat protection.

The incorporation of the above-mentioned advanced overheat protection systems in blankets has led to greater public confidence in using electric blankets, not just for pre-warming a bed, but also for all-night use as well. The increasing tendency for people to lie on or under electrically heated blankets has led to considerable research, mostly in U.S.A., on the question of whether being in close proximity to heating conductors, and the electro-magnetic fields which they radiate, has any adverse effect on the human body. Such research was initially triggered by the concern of many medical experts at the higher incidence of certain illnesses amongst people living in the vicinity of high voltage electric transmission lines. The field strengths under such power lines are very much higher than those emitted by electric blanket heating elements and to date no firm evidence has been found that these electro-magnetic fields can cause harm, although research is continuing. However, for the sake of public confidence, it is desirable that electric blankets should be so designed as to reduce to a minimum any electro-magnetic fields resulting from the electric current flowing through the heating elements.

Another disadvantage of known electric blankets having advanced overheat protection systems is the higher incidence of failure of an electrical component or fuse even though overheating has not occurred. The main reason for such failures is the transient breakdown of one of more of the components incorporated within the overheat protection circuitry.

Very often these overheat protection circuits incorporate diodes arranged "back-to-back" across the supply terminals. When a short circuit develops between the coaxial heating conductors, as a result of melting of the insulation layer, the increased current flow in these diodes causes a considerable increase in supply current, from a.c. to d.c., resulting in the blowing of a series fuse.

British Patent Specification No. 1585921 shows, for example, how the multi-heat configurations described in Specification No. 1155118 can be considerably improved, to provide reliable detection of a short circuit due to overheating at any position along the element length, by the fitting of a shunt diode in parallel with one or both of the heating conductors. In practice, however, it has been found that transient breakdown of any of the series diodes shown in FIGS. 2–4 of Specification No. 1585921 causes the series fuse to blow due to there being no limiting resistance in the fusing path. Thus, increasing the safety and reliability of the blanket with respect to overheating has led to increasing failures due to unforeseen control unit or switch component breakdowns caused by transient mains voltage perturbations.

SUMMARY OF THE INVENTION

The present invention relates to an improved form of electric blanket, or other electrically heated panel, in preferred embodiments of which the above-mentioned disadvantages may be overcome.

According to one aspect of the invention there is provided an electrically heated panel including an electrical heating element comprising inner and outer coaxial coil conductors separated by an electrically insulating layer and connected so that the conductors carry the same current but in opposite directions along the length of the element, and an adjustable control assembly for connection to a mains supply and connected to the heating element by a two-core flexible electrical cable, the control assembly incorporating control means to vary the supply of current to the heating element, the electric circuit which includes the heating element and control means also incorporating a fuse and protective components so arranged as to provide a significantly increased current in the circuit upon breakdown of any part of the aforesaid insulating layer and consequent contact between parts of the coaxial coil conductors.

Since the connection between the control assembly and the electrically heated panel itself comprises only a simple two core flex, the incidence of failure and/or fire as a result of damage or fatigue to the flex is reduced, when compared with the multi-core cables or sheathed heating conductors which lead to the switch or control unit in prior art arrangements.

The invention also provides, in another aspect thereof, an electrically heated panel including an electrical heating element comprising inner and outer coaxial coil conductors separated by an electrically insulating layer and connected so that the conductors carry the same current but in opposite directions along the length of the element, and an adjustable control assembly for connection to a mains electrical supply and electrically connected to the heating element, the control assembly incorporating control means to vary the supply of current to the heating element, the electric circuit which includes the heating element and control means also incorporating a fuse and protective components so arranged as to provide a significantly increased current in the circuit upon breakdown of any part of the aforesaid insulating layer and consequent contact between parts of the coaxial coil conductors, one of said coil conductors being so connected in the circuit that it is normally in series with at least one of said protective components so that in the event of a transient breakdown of the protective component the maintenance of the coil conductor in circuit limits the current in the circuit to a value insufficient to cause fuse operation.

The two aspects of the invention referred to above may be used separately or in combination. In each case, since the two coaxial coil conductors carry the same current in opposite directions along the length of the element the electro-magnetic fields generated by the two conductors tend to cancel out so that the net resulting electro-magnetic field is reduced to a minimum or is eliminated altogether.

In any of the arrangements referred to above the circuit preferably includes first current rectifying means, such as a diode, connected in series between adjacent ends of the two coaxial coil conductors.

The aforesaid protective components may include second current rectifying means, such as a diode, connected in parallel with one of said coil conductors, in which case said current rectifying means is connected in opposition to the first current rectifying means connected in series between the coil conductors, i.e. is orientated to permit flow of current in the opposite direction to the flow of current permitted by said first current rectifying means. A duplicate current rectifying means may also be connected in parallel with said protective second current rectifying means, to serve as a back-up.

The control means to vary the supply of current to the heating element may comprise a thyristor and an associated thyristor control circuit. In this case the protective components of the circuit may include one or more further current rectifying means connected in parallel across the thyristor and in opposition thereto, i.e. orientated to permit flow of current in the opposite direction to the flow of current permitted by the thyristor.

DETAILED DESCRIPTION OF THE PREFERRED EMBODIMENT

Figure 1:
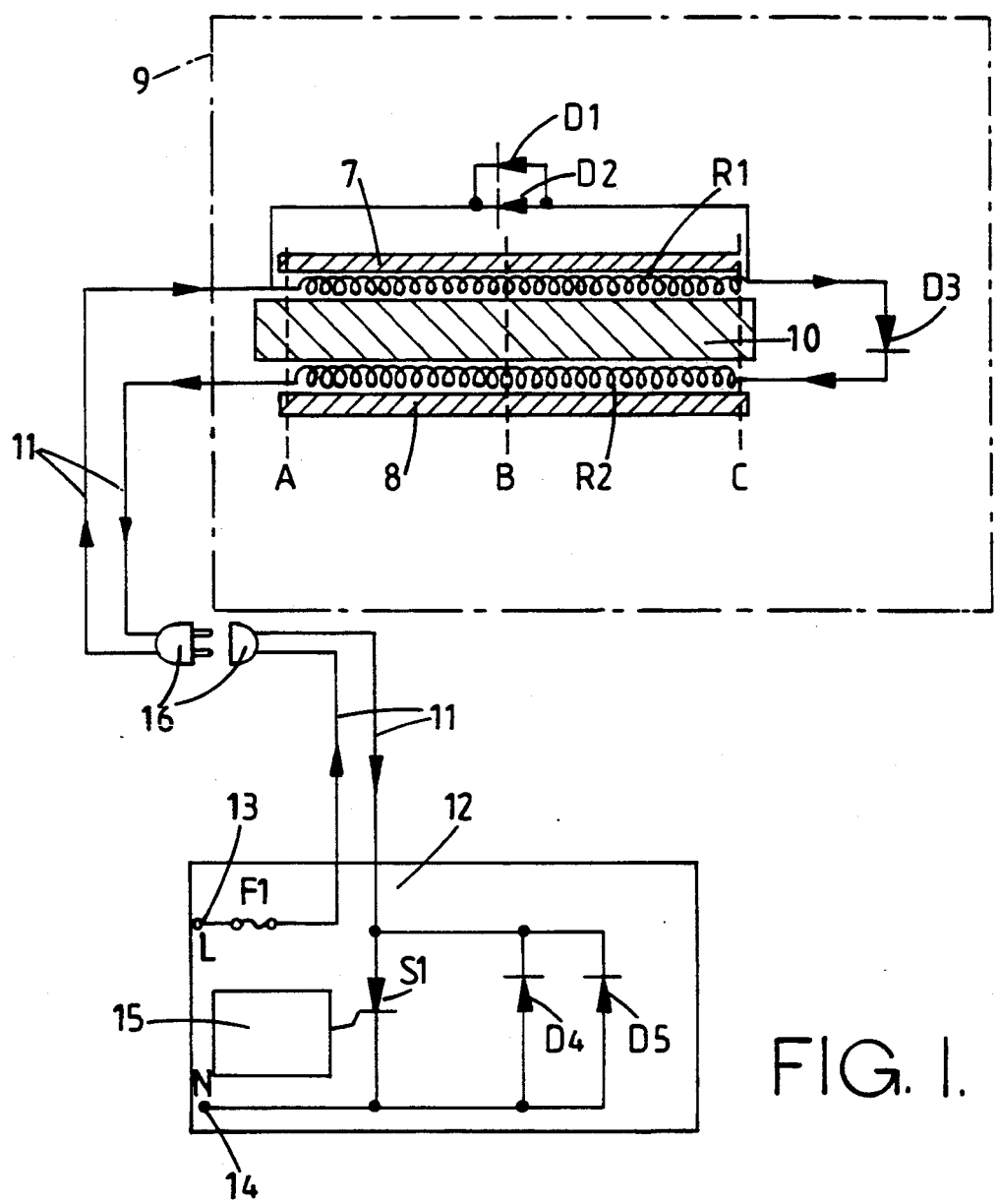
FIG. 1 is a diagrammatic representation of the electric circuit of an electric blanket.
Figure 2:
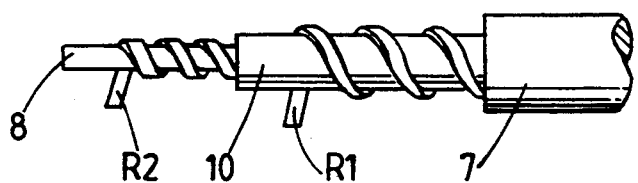
FIG. 2 is a fragmentary side elevation, partly broken away, of a portion of the blanket heating element.

The heating element of the blanket (indicated diagrammatically at 9) comprises outer and inner coaxial coil conductors R1 and R2. The inner coil R2 is wound on a central core 8 of rayon and is covered with a thin sheath of electrically insulating thermoplastic material which is indicated diagrammatically at 10. The outer coil R1 is wound on the sheet of insulating material 10 and is then itself covered in a second outer insulating sheath 7.

The heating element is shown only diagrammatically in the drawing, and in practice will be in the form of a single flexible cable which is secured to the fabric of the blanket 9 in a tortuous or convoluted pattern so as to extend over substantially the whole area of the blanket, in well known manner. The construction and materials of the blanket itself, the pattern in which the heating element is arranged, and the manner in which it is secured to the blanket, do not form a part of the present invention and will not therefore be described in detail. Those skilled in the art will be well aware of the alternative forms of construction which are available.

Two shunt diodes D1 and D2 are connected in parallel across the outer coil R1 and the two coils R1 and R2 are connected in series by a further diode D3 disposed in opposition to the diodes D1 and D2, i.e. the diode D3 is orientated to permit flow of current in the opposite direction to the flow of current permitted by the diodes D1 and D1.

The ends of the coils R1 and R2 remote from the diode D3 are connected by wires 11 to a control unit 12. As shown in the drawing, the diodes D1, D2 and D3 are provided on the blanket 9 itself and, together with the coils R1 and R2, form a part of the electrical circuit which is connected to the control unit 12 by the wires 11. The wires 11 may comprise simple two core electrical flex of well known kind, and may incorporate a simple two core plug and socket 16. The flex may be round or flat or may be of coaxial construction. The flex may be of any convenient length so that the control unit 12 may be placed in any convenient position in relation to the electric blanket. Since only a simple two core flex is required, the flex is not heavy, stiff or intrusive and may be conveniently laid or tucked in any position required so that the control unit 12 may, for example, be positioned on a bedside table or in any other convenient position, or may be embodied in an in-line switch near to the blanket.

Furthermore, the blanket may be disconnected from the control unit 12, by disconnecting the plug and socket 16, so that the blanket may be washed. This is not generally possible with prior art electrical blankets where, due to the necessity of using heavy sheathed or multicore connecting cables, the control unit must in practice remain permanently connected to the blanket.

The wire 11 leading to the outer coil R1 is connected, in the control unit 12, to the line terminal 13 of an electric mains supply, through a fuse F1.

The other wire 11, leading from the inner coil R2, is connected to the mains neutral terminal 14 through a thyristor S1 which is controlled by a manually adjustable control circuit indicated diagrammatically at 15. Shunt diodes D4 and D5 are connected in parallel across the thyristor S1, in opposition to the thyristor and to the diode D3 which connects the coils R1 and R2 in series, i.e. the shunt diodes D4 and D5 are orientated to permit flow of current in the opposite direction to the flow of current permitted by the thyristor S1 and the diode D3.

The insulating thermoplastic sheath 10 between the coils R1 and R2 may be either a low melting temperature plastics such as polyethylene or a higher melting temperature pvc, the impedance of which decreases with rise in temperature. The outer sheath 7 around the coil R1 may also be made of pvc. The resistance of the inner coil R2 is typically one quarter to one tenth of the resistance of the outer coil R1 which constitutes the main heating element of the blanket.

Since the inner conductor R2 makes only a comparatively small contribution to the heating effect, the conductor R2 can be of a standard design and construction, even though the design of the main, outer conductor R1 may be one of a number of different designs depending on the required characteristics of the electric blanket. In one suitable form of construction the inner conductor R2 may comprise a standard telephone type tinsel core. Because the main heating element R1 is wound around the inner element R2, it uses a greater length of conductor than the inner element. Consequently, it may be formed from a comparatively low resistance alloy which may be much cheaper than the conductors used in prior art blankets.

In normal operation of the blanket, current flows through R1, D3, R2 and S1 in the positive half cycles of the mains supply, the current depending on the manual setting of the thyristor control circuit 15. Since the diode D3 connects the two coils R1 and R2 together at the same end of the heating element, it will be seen that the current flow through the coils R1 and R2 is equal but in opposite directions. Consequently, the electromagnetic fields generated by the two coils tend to cancel each other out.

The diodes D1, D2, D4 and D5 perform no function when the heating element is operating normally, since they are in opposition to the direction of current during the positive half cycles when current flows through the coils R1 and R2.

If overheating of the heating element occurs for any reason, the insulating thermoplastic layer 10 between the coils will melt so as to cause a short circuit or low impedance path between the coils R1 and R2 at the location where the insulation melts. As a result of this short circuit or low impedance path, current will begin to flow through R1 and R2 in both the positive and negative half cycles of the mains supply, in view of the short-circuiting across the diode D3. The addition of the shunt diode D1 (and its backup D2) causes the current through the short circuit to be significantly increased during the negative half cycle, regardless of where the short circuit has occurred, resulting in blowing of the series fuse F1. Diode D4 (and its backup Diode D5), in parallel with the controlling thyristor S1, provides a path to ground for the current in the negative half cycle.

The provision of the backup diodes D2 and D5 ensures that the circuit still continues to function even if either D1 or D4 should break down and go open circuit. To meet the requirements of international standards, the blanket must either fail safe, or continue to be overheat protected, even in the event of any open or short circuit failure of any one component within the protective circuitry.

In the event that any one of the diodes D1 to D5, or even S1, should break over due to mains transients, the resistance coil R2 will always be in series with the component, thus limiting the surge current to a value which will not blow the fuse F1 nor cause short circuit failure of any of the diodes or thyristor.

In a typical practical circuit of the kind shown in the drawing, for a 60 W, 240 V a.c. blanket, the resistance of the coil R1 may be 412 ohms and the resistance of the coil R2 may be 69 ohms, and the fuse F1 may be rated to blow at a current exceeding 350 mA.

Since the total resistance of the two coils is 481 ohms, the normal current equals $$\frac{240}{\sqrt{2 \times 481}} = 0.35 \text{ amps.}$$

If a short circuit should develop at position "A" shown in the drawing, the short circuit current flow is unlimited, resulting in the fuse F1 blowing.

If a short circuit develops at the opposite end "C" of the heating element, the current flow in each positive half cycle remains the same, but the current flow in the negative half cycle increases from zero to $$\frac{240}{\sqrt{2 \times 69}} = 2.46 \text{ amps}$$

i.e. The r.m.s. current increases from 0.35 amps to $\sqrt{(0.35^2 + 2.46^2)} = 2.48$ amps, or seven times the nominal fuse rating of F1, causing the fuse to blow.

If a short circuit should occur at the worst position, the centre of the heating element as indicated at "B" in the drawing, the resulting current I is given by:

$$I^2 = \frac{+240}{\sqrt{2 \times 481/2}}^2 + \frac{-240}{\sqrt{2 \times 412/4 + 69/2}}^2$$

$$= 0.706^2 + 1.236^2$$

i.e. the rms current increases from 0.35 amps to 1.425 amps, or 4.07 times the nominal fuse rating of fuse F1, which therefore again blows.

The electric blanket is therefore fully overheat protected, and the fuse F1 will blow no matter where the overheating and short circuit occur along the length of the heating element.

A transient breakover of any diode or thyristor will result in the absolute worst case of a single cycle surge lasting up to 10 ms (full half cycle) of 340 V÷69 ohms=4.93 amps. This is well within the single cycle surge current rating of all low cost commercial diodes/thyristors of 8–30 amps peak, and will not cause blowing either of a delay, or semi-delay, type of cartridge fuse.

The thyristor control circuit 15 enables the power input to the heating element of the blanket to be regulated so as to provide a variable heat or comfort setting. The control may be performed in many ways, using analogue or digital techniques, employing commercially available integrated circuit SCR control ICs or simpler versions using discrete transistors or programmable uni-junction devices. Such arrangements will be well understood by those skilled in the art and need not therefore be described in detail.

One of the major advantages that the described circuit offers is that because of the large increase in fusing current resulting from an overheat occurring, even in the worst case, the control duty cycle is almost immaterial to the operation of the safety system. Even if the SCR is "off", the current flow through the short circuit, at the middle of the heating element, during negative cycle alone is 1.236÷0.35=3.53×nominal.

This increase, even allowing for manufacturing resistance tolerances of, say, ±5% and mains supply tolerances of, say, ±10%, would still mean 3.53÷(1.05×1.1)=3.05 times increase in the nominal fuse current. The overheat protection will thus work equally well whatever the heat setting of the control unit 12. This is important because many conventional multi-heat blankets based on the prior art previously mentioned do not, when toleranced for all possible worst case conditions, guarantee an adequate fusing current regardless of overheat position and heat control setting.

In a further embodiment of the invention, temperature sensing of the blanket heating element can be achieved by either:

(i) making R1 and R2 of high temperature coefficient alloys such as pure nickel and adding a suitable resistance in series with the cathode of thyristor S1, so as to develop a feedback voltage by which the duty cycle of the control circuit can be varied, or (ii) monitoring the leakage current through the insulation 10, or through a separate sensing cable connected to the R2 side of the heating element, and adding a suitable resistance in series with the diodes D4 and D5, so as to develop a feedback voltage, in the negative half cycle, which can be used to control the duty cycle of the thyristor S1. (In either case the value of the series resistance is chosen so as not to substantially reduce the fusing current). It should be noted that in either of the above methods for adding temperature control of the heating element, there is no necessity for any further interconnecting leads between the blanket and the switch/control.

I claim:

1. An electrically heated panel including an electrical heating element comprising inner and outer coaxial coil conductors separated by an electrically insulating layer and connected so that the conductors carry the same current but in opposite directions along the length of the element, and an adjustable control assembly for connection to a mains supply and connected to the heating element by a two-core flexible electrical cable, the control assembly incorporating control means to vary the supply of current to the heating element, said heating element and control means being included in an electric circuit which also includes a fuse and protective components so arranged as to provide a significantly increased current in the circuit upon breakdown of any part of the aforesaid insulating layer and consequent contact between parts of the coaxial coil conductors, said protective components comprising first current rectifying means connected in series between adjacent ends of the two coaxial coil conductors, and second current rectifying means connected in parallel with one of said coil conductors, the second current rectifying means being oriented to permit flow of current in the opposite direction to the flow of current permitted by the first current rectifying means, and said first and second current rectifying means being provided on the electrically heated panel itself and forming, with said coaxial coil conductors, a part of the electric circuit which is connected to said adjustable control assembly by said two-core flexible electrical cable.

2. An electrically heated panel according to claim 1, wherein said first current rectifying means comprises a diode.

3. An electrically heated panel according to claim 1, wherein a duplicate protective current rectifying means is connected in parallel with the said protective second current rectifying means, to serve as a back-up.

4. An electrically heated panel according to claim 1, wherein said protective second current rectifying means comprises a diode.

5. An electrically heated panel according to claim 1, wherein the control means to vary the supply of current to the heating element comprise a thyristor and an associated thyristor control circuit.

6. An electrically heated panel according to claim 5 wherein the protective components of the circuit include further current rectifying means connected in parallel across the thyristor and oriented to permit flow of current in the opposite direction to the flow of current permitted by the thyristor.

7. An electrically heated panel according to claim 1, wherein the resistance of one of said coaxial coil conductors is from one quarter to one tenth of the resistance of the other coil conductor.

8. An electrically heated panel according to claim 1, wherein said one coaxial coil conductor is the inner conductor and the other coil conductor is the outer conductor.

9. An electrically heated panel according to claim 1, wherein said one coaxial coil conductor is in series with all of the protective components in the circuit.

* * * * *